US012387214B2

(12) United States Patent
Greene et al.

(10) Patent No.: US 12,387,214 B2
(45) Date of Patent: Aug. 12, 2025

(54) STORED VALUE PAYMENT INSTRUMENT, HAVING PAYMENT CARD CHARACTERISTICS, FOR VIRTUAL CASH TRANSACTIONS

(71) Applicant: Bank of America Corporation, Charlotte, NC (US)

(72) Inventors: Steven Greene, New York, NY (US); Kerry Vaughan, Pennington, NJ (US); Srinath Chakravarty, Plano, TX (US); Aravind Shankaragouda Singtalur, McKinney, TX (US); Dinesh Kumar Agrawal, Rowlett, TX (US); Stephen Belton, Garden City, NY (US); Kenneth Boyd, Richmond, VA (US); Petar Puskarich, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 173 days.

(21) Appl. No.: 18/100,890

(22) Filed: Jan. 24, 2023

(65) Prior Publication Data
US 2024/0249286 A1    Jul. 25, 2024

(51) Int. Cl.
*G06Q 20/40*  (2012.01)
*G06Q 20/32*  (2012.01)
(Continued)

(52) U.S. Cl.
CPC ... *G06Q 20/40145* (2013.01); *G06Q 20/3274* (2013.01); *G06Q 20/341* (2013.01); *G06Q 20/381* (2013.01)

(58) Field of Classification Search
None
See application file for complete search history.

(56) References Cited

U.S. PATENT DOCUMENTS 10,055,715 B1 *  8/2018  Grassadonia .......... G06Q 20/36
10,783,545 B2 *  9/2020  Swamidurai ......... G06Q 20/065
(Continued)

FOREIGN PATENT DOCUMENTS

| WO | WO-2012166790 A1 * | 12/2012 | ........... G06Q 20/065 |
| WO | WO-2023227981 A1 * | 11/2023 | ........... G06Q 20/065 |
| WO | WO-2024072915 A1 * | 4/2024 | ............. G06Q 20/06 |

OTHER PUBLICATIONS

Sveta Cherednichenko. "How to Create a Cryptocurrency eWallet App: Best Practices and Features." (Jul. 22, 2022). Retrieved online Nov. 6, 2024. https://www.mobindustry.net/blog/how-to-create-a-cryptocurrency-ewallet-app-best-practices-and-features/ (Year: 2022).*

(Continued)

*Primary Examiner* — James A Reagan
(74) *Attorney, Agent, or Firm* — Weiss & Arons LLP (57) ABSTRACT

A method for transferring goods from a digital+bitcoin (d+b) stored value transaction instrument-supporting vendor to a user device, or a device user, such as a d+b stored value transaction instrument is provided. The device may be registered with a cryptocurrency provider and a value allocation. The method may include receiving a user request configured for a cryptocurrency-based transaction; transmitting a consent to transact the cryptocurrency-based transaction and, in response to the transmitting, receiving, from the user device, a Quick Response (QR) code. The code specifies, at least: a) an amount of cryptocurrency; and b) a product or a service to be exchanged for the amount of cryptocurrency. The method may also receive a biometric characteristic that confirms the transaction. The method may then receive the amount of cryptocurrency via the d+b stored value transaction instrument, and transmit a confirmation of receipt of the cryptocurrency.

15 Claims, 8 Drawing Sheets

(51) Int. Cl.
   *G06Q 20/34*     (2012.01)
   *G06Q 20/38*     (2012.01)

(56) References Cited

U.S. PATENT DOCUMENTS

| | | | | |
|---|---|---|---|---|
| 11,075,904 | B2* | 7/2021 | Jha | H04L 9/3231 |
| 11,164,181 | B2* | 11/2021 | Li | H04L 9/50 |
| 11,475,432 | B2* | 10/2022 | Cheong | G06Q 20/3224 |
| 11,531,974 | B2* | 12/2022 | Bordash | G06Q 20/102 |
| 11,564,266 | B1* | 1/2023 | Kahn | H04W 76/10 |
| 11,593,793 | B2* | 2/2023 | Zimmerman | G06Q 20/407 |
| 11,636,475 | B1* | 4/2023 | Calinog | G06Q 20/102 |
| | | | | 705/26.8 |
| 11,750,388 | B2* | 9/2023 | Gagne-Keats | H04L 9/0866 |
| 12,026,789 | B2* | 7/2024 | Jevans | G06Q 20/36 |
| 2016/0012465 | A1* | 1/2016 | Sharp | G06Q 20/321 |
| | | | | 705/14.17 |
| 2017/0132630 | A1* | 5/2017 | Castinado | G06F 16/2255 |
| 2017/0316390 | A1* | 11/2017 | Smith | G06Q 20/407 |
| 2018/0039667 | A1* | 2/2018 | Pierce | H04L 9/3247 |
| 2019/0156301 | A1* | 5/2019 | Bentov | G06Q 20/405 |
| 2019/0325473 | A1* | 10/2019 | Swamidurai | H04L 9/50 |
| 2019/0333048 | A1* | 10/2019 | DiCross | G06Q 50/01 |
| 2019/0340586 | A1* | 11/2019 | Sheng | G06Q 20/367 |
| 2019/0392511 | A1* | 12/2019 | Mahajan | H04L 9/3239 |
| 2020/0005283 | A1* | 1/2020 | Zimmerman | G06Q 20/381 |
| 2020/0111066 | A1* | 4/2020 | Anstey | H04L 67/104 |
| 2020/0112833 | A1* | 4/2020 | Cheong | G06Q 20/3224 |
| 2020/0160455 | A1* | 5/2020 | Singh | G06Q 10/10 |
| 2020/0258152 | A1* | 8/2020 | Naggar | H04L 9/50 |
| 2020/0287897 | A1* | 9/2020 | Jha | H04L 9/3231 |
| 2020/0380481 | A1* | 12/2020 | Kalaboukis | G06Q 20/102 |
| 2020/0387891 | A1* | 12/2020 | Paschini | G06Q 20/3678 |
| 2021/0073913 | A1* | 3/2021 | Ingargiola | G06F 16/2358 |
| 2022/0051219 | A1* | 2/2022 | Sells | H04L 9/50 |
| 2022/0253952 | A1* | 8/2022 | Jevans | G06Q 20/065 |
| 2023/0055618 | A1* | 2/2023 | Jakobsson | G06Q 20/3674 |
| 2023/0146474 | A1* | 5/2023 | Yeom | G06Q 20/3678 |
| | | | | 705/41 |
| 2023/0252467 | A1* | 8/2023 | Calinog | G06Q 20/40 |
| | | | | 705/26.8 |
| 2023/0325814 | A1* | 10/2023 | Vijayan | G06Q 20/3829 |
| | | | | 705/66 |
| 2024/0015806 | A1* | 1/2024 | Kahn | H04W 12/069 |
| 2024/0214194 | A1* | 6/2024 | Kapur | H04L 9/50 |
| 2024/0281796 | A1* | 8/2024 | Finlow-Bates | G06Q 20/4016 |

OTHER PUBLICATIONS

Enisa. "Security of Mobile Payments and Digital Wallets." (Dec. 2016). Retrieved online Nov. 6, 2024. https://www.enisa.europa.eu/publications/mobile-payments-security/@@download/fullReport (Year: 2016).*

World Bank Group. "Fast Payment Systems." (Sep. 2021). Retrieved online Nov. 6, 2024. https://fastpayments.worldbank.org/sites/default/files/2021-11/Fast%20Payment%20Flagship_Final_Nov%201.pdf (Year: 2021).*

* cited by examiner

STORED VALUE PAYMENT INSTRUMENT, HAVING PAYMENT CARD CHARACTERISTICS, FOR VIRTUAL CASH TRANSACTIONS

FIELD OF TECHNOLOGY

Aspects of the disclosure relate to transacting using mechanisms other than cash and known payment instruments.

BACKGROUND OF THE DISCLOSURE

Currently the only transactions that provide anonymity to the purchaser for value are cash-based transactions.

However, cash-based transactions are not always convenient for the purchaser at least because the purchaser must take the security risk of carrying cash at all times. Furthermore, the purchaser cannot purchase product or services remotely because of the need for a hand-to-hand cash transfer. Along the same lines, a purchaser for cash cannot take advantage of such systems as the Internet, which allow the purchaser to transact with and purchase from a remote product vendor.

While cash provides the advantage of supporting anonymous transfers for value, nevertheless, the drawbacks associated with cash transactions make finding other anonymous transaction solutions attractive.

It would be desirable for example to provide a digital wallet that enables a user to transact anonymously.

It would be further desirable for example to provide a stored value transaction instrument, having payment card characteristics, for use with virtual cash transactions, that leverages the anonymity associated with bitcoin, or other more secure variants, such as a StableCoin, in order to support anonymous transactions.

StableCoin refers to cryptocurrency which has a value that is pegged, or tied, to that of another currency, commodity or financial instrument. StableCoins pursue price stability by maintaining reserve assets as collateral or through algorithmic formulas that are intended to control supply. Stablecoins aim to provide an alternative to the high volatility of the most popular cryptocurrencies, including Bitcoin (BTC), which has, recently, made crypto holdings less suitable for common transactions while, at the same time provide the anonymity associated with other cryptocurrencies.

SUMMARY

A digital+bitcoin (d+b) stored value transaction instrument system is provided. The system may include a processor for controlling a receiver and a transmitter.

The receiver may receive a user registration for the d+b stored value transaction instrument. The receiver may receive a value allocation from the user to the d+b stored value transaction instrument and may receive from the user a request for a cryptocurrency transaction with a d+b stored value transaction instrument-supporting vendor.

The transmitter may be used to transmit the user registration to a partner cryptocurrency provider. The receiver may also receive a consent to transact from the d+b stored value transaction instrument-supporting vendor.

The receiver and the transmitter may be further configured to collaborate to exchange Quick Response (QR) codes between the customer and the d+b stored value transaction instrument-supporting vendor. Each of the QR codes may be encoded with a) an amount of cryptocurrency greater than or equal to a value necessary for the purchase, and b) a product or a service to be provided, in return for the amount of cryptocurrency, by the d+b stored value transaction instrument-supporting vendor to the user.

In response to exchanges scans of the QR codes between the customer and the d+b stored value transaction instrument-supporting vendor, the method may further include prompting the user to provide a biometric characteristic to confirm the cryptocurrency transaction.

The receiver may be further configured to receive the biometric characteristic from the user and, in response to receiving the biometric characteristic, the processor may be further configured to procure the amount of cryptocurrency from the cryptocurrency provider and transfer in the form of cryptocurrency using the transmitter the value necessary for the purchase to the d+b stored value transaction instrument-supporting vendor. The receiver may be yet further configured to receive from the d+b stored value transaction instrument-supporting vendor a confirmation of receipt of the cryptocurrency. In addition, the receiver may also be further configured to receive a delivery schedule for the good or service received in return for the cryptocurrency.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A method for providing a digital+bitcoin (d+b) stored value transaction instrument is provided. The method may include receiving a user registration for the d+b stored value transaction instrument, configuring the user registration with a partner cryptocurrency provider, receiving a value allocation from the user to the d+b stored value transaction instrument, receiving from the user a request for a cryptocurrency transaction with a d+b stored value transaction instrument-supporting vendor, receiving a consent to transact from the d+b stored value transaction instrument-supporting vendor, and exchanging Quick Response (QR) codes between the customer and the d+b stored value transaction instrument-supporting vendor.

Each of the QR codes is preferably encoded with: a) an amount of cryptocurrency greater than or equal to a value necessary for the purchase, and b) a product or a service to be provided by the d+b stored value transaction instrument-supporting vendor to the user.

In response to receiving the scan of the QR code received by the user and in response to the scan of the QR code received by the d+b stored value transaction instrument-supporting vendor, the method may also include prompting the user to provide a biometric characteristic to confirm the cryptocurrency transaction. In response to receiving the biometric characteristic, the method may include procuring the amount of cryptocurrency from the cryptocurrency provider, transferring, in the form of cryptocurrency, the value necessary for the purchase to the d+b stored value transaction instrument-supporting vendor and, optionally, receiving from the d+b stored value transaction instrument-supporting vendor a confirmation of receipt of the cryptocurrency. It should be noted that the confirmation of receipt should preferably be transaction data agnostic.

In certain embodiments, the method may include receiving from the d+b stored value transaction instrument-supporting vendor a confirmation of receipt of the cryptocurrency and/or receiving a confirmation from the d+b stored value transaction instrument-supporting vendor that the cryptocurrency has been auto-converted to a second currency. The method may temporarily, or permanently, store the confirmation of the receipt of the cryptocurrency pending receipt by the user of the product or service. It should be noted that, in the case of receiving a confirmation from the d+b stored value transaction instrument-supporting vendor that the cryptocurrency has been auto-converted to a second currency, the confirmation of receipt should preferably be transaction data agnostic.

Certain methods according to the disclosure may include receiving a user registration for the d+b stored value transaction instrument, configuring the user registration with a partner cryptocurrency provider, receiving a value allocation, from the user, to the d+b stored value transaction instrument, receiving from the user a request for a cryptocurrency transaction with a d+b stored value transaction instrument-supporting vendor, receiving a consent to transact from the d+b stored value transaction instrument-supporting vendor, activating a Quick Response (QR) code feature on the d+b stored value transaction instrument at the user device for an amount that is less than or equal to the value allocation, and exchanging Quick Response (QR) codes between the customer and the d+b stored value transaction instrument-supporting vendor.

Each of the QR codes may preferably be encoded with a) an amount of cryptocurrency greater than or equal to a value necessary for the purchase and/or b) a product or a service to be provided by the d+b stored value transaction instrument-supporting vendor to the user in exchange for the amount of cryptocurrency. In response to receiving a scan of the QR codes between the customer and the d+b stored value transaction instrument-supporting vendor, the method may prompt the user to provide a biometric characteristic to confirm the cryptocurrency transaction and then, following the prompting, receive the biometric characteristic from the user.

In response to receiving the biometric characteristic, the method may procure the amount of cryptocurrency from the cryptocurrency provider, transfer, in the form of cryptocurrency, the value necessary for the purchase to the d+b wallet-supporting vendor and receive from the d+b wallet-supporting vendor a confirmation of receipt of the cryptocurrency, as detailed above.

In certain embodiments, the systems and methods set forth herein may preferably flag transactions and/or patterns of transactions as possibly suspicious. Such flagging may preferably limit abuse by reducing and/or eliminating the misuse of substantially anonymous transactions. Such substantially anonymous transactions are described herein for money laundering or other similar behavior.

Flagging of suspicious virtual cash transactions may involve one or more of the following: identifying fraudulent QR code transfers, determining the occurrence of attempted suspicious Bitcoin withdrawals, falsifying registry information related to registered vendors and/or registered avatars, repeated unsuccessful attempts to engage the virtual cash transaction system, and other similar attempts to defraud the system.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is to be understood that other embodiments may be utilized and that structural, functional and procedural modifications may be made without departing from the scope and spirit of the present disclosure.

The steps of methods may be performed in an order other than the order shown or described herein. Embodiments may omit steps shown or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

Figure 1:
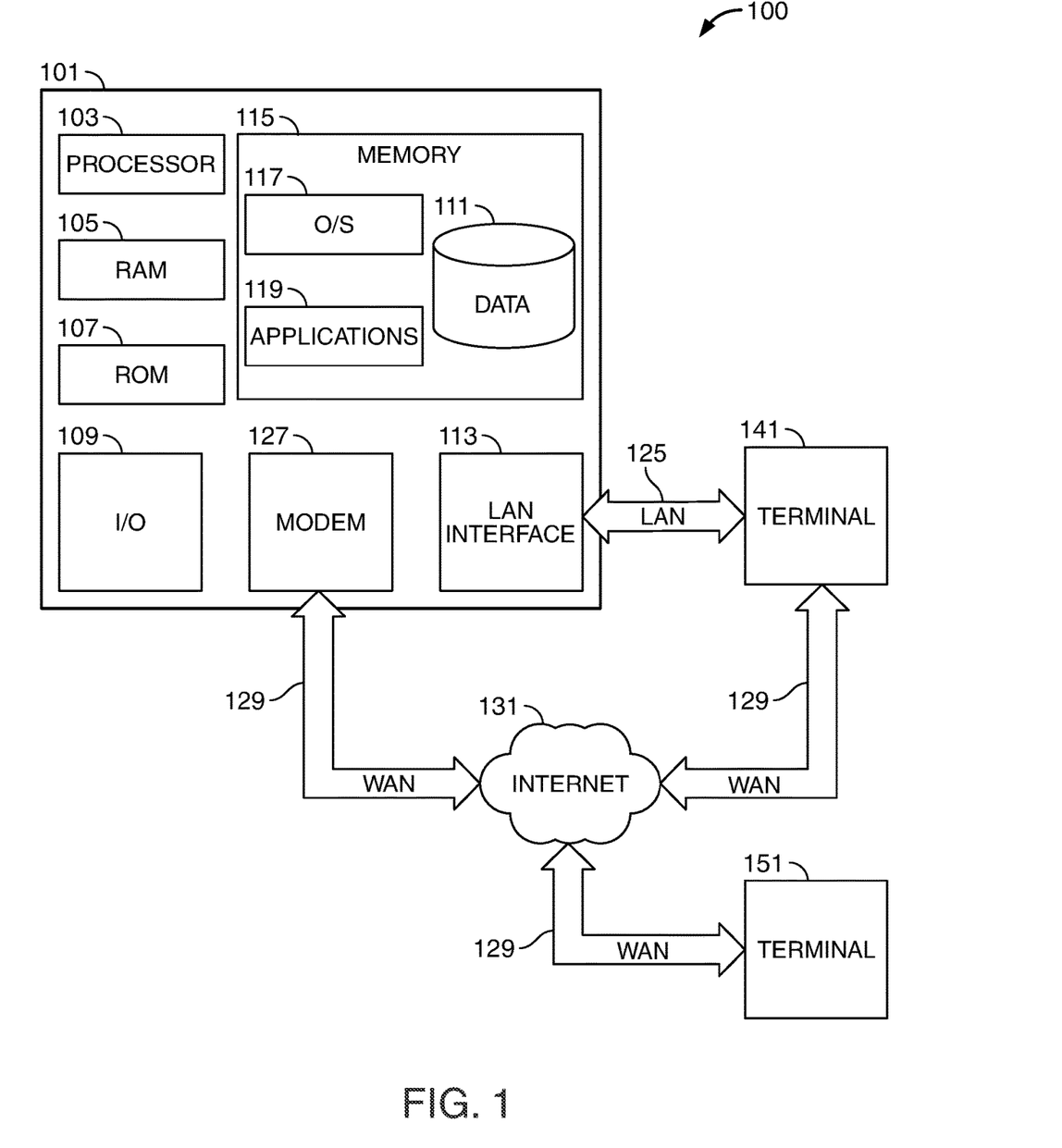
FIG. 1 shows an illustrative system in accordance with principles of the disclosure.

FIG. 1 shows an illustrative block diagram of system 100 that includes computer 101. Computer 101 may alternatively be referred to herein as an "engine," "server" or a "computing device." Computer 101 may be a workstation, desktop, laptop, tablet, smartphone, or any other suitable computing device. Elements of system 100, including computer 101, may be used to implement various aspects of the systems and methods disclosed herein. Each of the systems, methods and algorithms illustrated below may include some or all of the elements and apparatus of system 100.

Computer 101 may have a processor 103 for controlling the operation of the device and its associated components, and may include RAM 105, ROM 107, input/output ("I/O") 109, and a non-transitory or non-volatile memory 115. Machine-readable memory may be configured to store information in machine-readable data structures. The processor 103 may also execute all software running on the computer. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application program(s) 119 along with any data 111 needed for the operation of the system 100. Memory 115 may also store videos, text, and/or audio assistance files. The data stored in memory 115 may also be stored in cache memory, or any other suitable memory.

I/O module 109 may include connectivity to a microphone, keyboard, touch screen, mouse, and/or stylus through which input may be provided into computer 101. The input may include input relating to cursor movement. The input/output module may also include one or more speakers for providing audio output and a video display device for providing textual, audio, audiovisual, and/or graphical output. The input and output may be related to computer application functionality.

System 100 may be connected to other systems via a local area network (LAN) interface 113. System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129 but may also include other networks. When used in a LAN networking environment, computer 101 is connected to LAN 125 through LAN interface 113 or an adapter. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit retrieval of data from a web-based server or application programming interface (API). Web-based, for the purposes of this application, is to be understood to include a cloud-based system. The web-based server may transmit data to any other suitable computer system. The web-based server may also send computer-readable instructions, together with the data, to any suitable computer system. The computer-readable instructions may include instructions to store the data in cache memory, the hard drive, secondary memory, or any other suitable memory.

Additionally, application program(s) 119, which may be used by computer 101, may include computer executable instructions for invoking functionality related to communication, such as e-mail, Short Message Service (SMS), and voice input and speech recognition applications. Application program(s) 119 (which may be alternatively referred to herein as "plugins," "applications," or "apps") may include computer executable instructions for invoking functionality related to performing various tasks. Application program(s) 119 may utilize one or more algorithms that process received executable instructions, perform power management routines or other suitable tasks.

Application program(s) 119 may include computer executable instructions (alternatively referred to as "programs"). The computer executable instructions may be embodied in hardware or firmware (not shown). The computer 101 may execute the instructions embodied by the application program(s) 119 to perform various functions.

Application program(s) 119 may utilize the computer-executable instructions executed by a processor. Generally, programs include routines, programs, objects, components, data structures, etc., that perform particular tasks or implement particular abstract data types. A computing system may be operational with distributed computing environments where tasks are performed by remote processing devices that are linked through a communications network. In a distributed computing environment, a program may be located in both local and remote computer storage media including memory storage devices. Computing systems may rely on a network of remote servers hosted on the Internet to store, manage, and process data (e.g., "cloud computing" and/or "fog computing").

Any information described above in connection with data 111, and any other suitable information, may be stored in memory 115.

The invention may be described in the context of computer-executable instructions, such as application(s) 119, being executed by a computer. Generally, programs include routines, programs, objects, components, data structures, etc., that perform particular tasks or implement particular data types. The invention may also be practiced in distributed computing environments where tasks are performed by remote processing devices that are linked through a communications network. In a distributed computing environment, programs may be located in both local and remote computer storage media including memory storage devices. It should be noted that such programs may be considered, for the purposes of this application, as engines with respect to the performance of the particular tasks to which the programs are assigned.

Computer 101 and/or terminals 141 and 151 may also include various other components, such as a battery, speaker, and/or antennas (not shown). Components of computer system 101 may be linked by a system bus, wirelessly or by other suitable interconnections. Components of computer system 101 may be present on one or more circuit boards. In some embodiments, the components may be integrated into a single chip. The chip may be silicon-based.

Terminal 141 and/or terminal 151 may be portable devices such as a laptop, cell phone, tablet, smartphone, or any other computing system for receiving, storing, transmitting and/or displaying relevant information. Terminal 141 and/or terminal 151 may be one or more user devices. Terminals 141 and 151 may be identical to system 100 or different. The differences may be related to hardware components and/or software components.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, cloud-based systems, programmable consumer electronics, network PCs, minicomputers, mainframe computers, distributed computing environments that include any of the above systems or devices, and the like.

Figure 2:
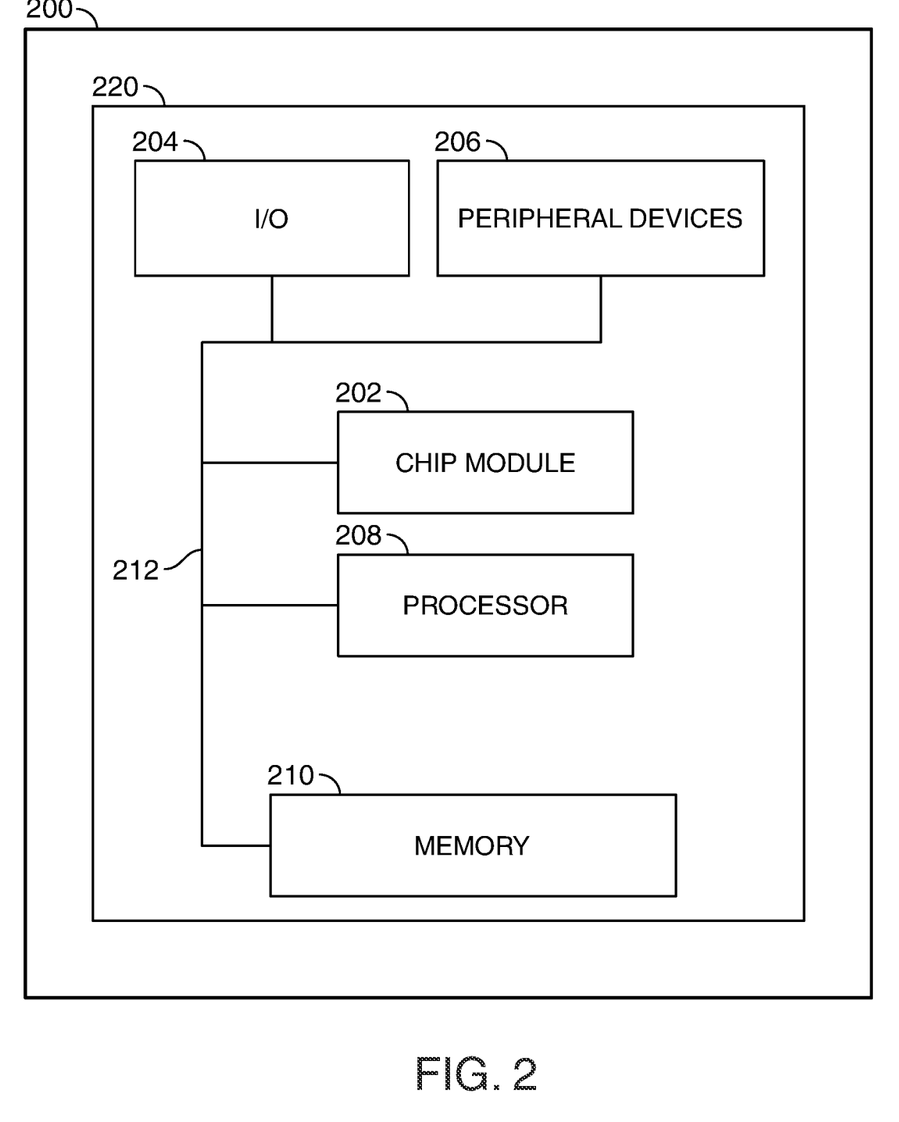
FIG. 2 shows an illustrative system in accordance with principles of the disclosure.

FIG. 2 shows illustrative apparatus 200 that may be configured in accordance with the principles of the disclosure. Apparatus 200 may be a computing device. Apparatus 200 may include one or more features of the apparatus shown in FIG. 2. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions, (which may be alternatively referred to herein as "computer instructions" or "computer code"), applications such as applications 119, signals, and/or any other suitable information or data structures.

Components 202, 204, 206, 208 and 210 may be coupled together by a system bus or other interconnections 212 and may be present on one or more circuit boards such as circuit board 220. In some embodiments, the components may be integrated into a single chip. The chip may be silicon-based.

Figure 3:
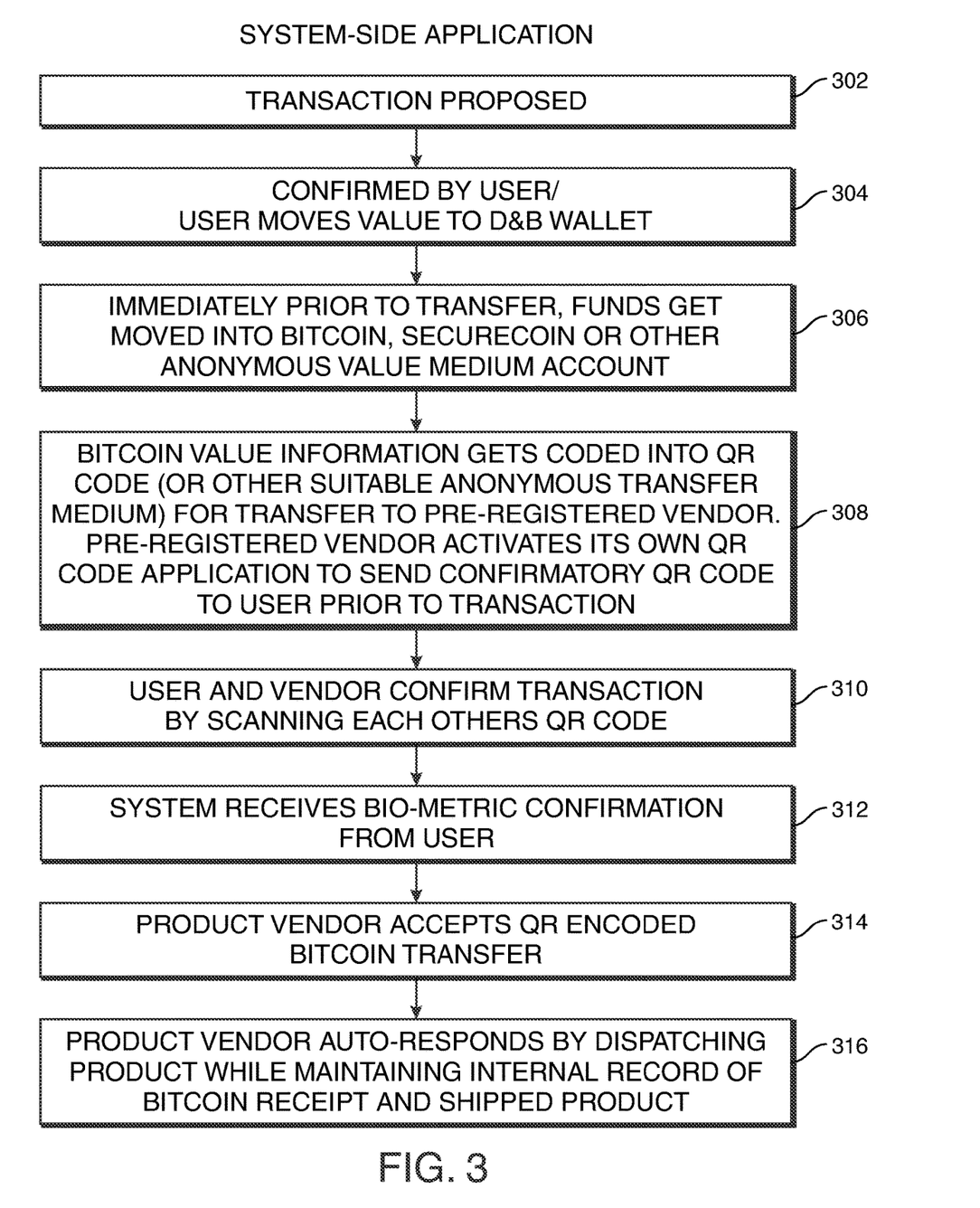
FIG. 3 shows an illustrative flow diagram of a system-side application in accordance with the principles of the disclosure.

FIG. 3 shows an illustrative flow diagram of a system-side application in accordance with the principles of the disclosure. At 302, a user configures a potential transaction—i.e., a transaction is proposed.

At 304, the user confirms the particulars of the transaction. Then, the user, checks his d+b wallet to see if sufficient value is stored therein to fund the transaction. If there is sufficient value stored to fund the transaction, the transaction proceeds on to step 306. If not, the user may be instructed or otherwise prompted to move sufficient value to the wallet to cover the transaction.

Preferably immediately prior to value transfer associated with the transaction, funds may be converted into Bitcoin, Securecoin or other anonymous value medium account associated with a user anonymous value account, as shown at 306. At 308, Bitcoin, or other suitable value information, may get coded into a QR code for transfer to a pre-registered vendor. The pre-registered vendor may optionally activate its own QR code application to send a confirmatory QR code to user prior to transaction.

At 310, the user and vendor may confirm the transaction by scanning the code they received from each other. Alternatively, the QR aspect of the system could be operational in only one direction—i.e., with a single QR code, and scanning of same, being used a trigger to launch the transaction.

As a final confirmatory step in the transaction, the system may receive a bio-metric confirmation from user, as shown at 312. Such a bio-metric confirmation may include receiving an iris scan, receiving an electronic file associated with a fingerprint of the user, or any other suitable electronic record or file of a biometric characteristic associated with the user.

Once the transaction is fully confirmed by the receiving of the file corresponding to the biometric characteristic, the product (or service) vendor may accept the QR encoded Bitcoin transfer, as shown at 314. Because the transfer is in the form of a transmission of a QR encoded Bitcoin transfer, the record of the transaction will preferably appear as a QR encoded, Bitcoin-based, transmission from the user, independent of any record of a financial transaction from the user side.

In certain embodiments, the product vendor may autorespond to a transfer in the form of a transmission of a QR encoded Bitcoin transfer, as set forth herein, by dispatching product (or arranging, performing or dispatching a service) while maintaining an internal record of a Bitcoin receipt as well as maintaining an internal record by shipping the product, as shown in 316. The user/purchaser, on the other hand, may preferably not maintain or preserve any record of the transaction other than an outgoing bitcoin transfer via QR code or other suitable anonymous transfer mechanism.

Figure 4:
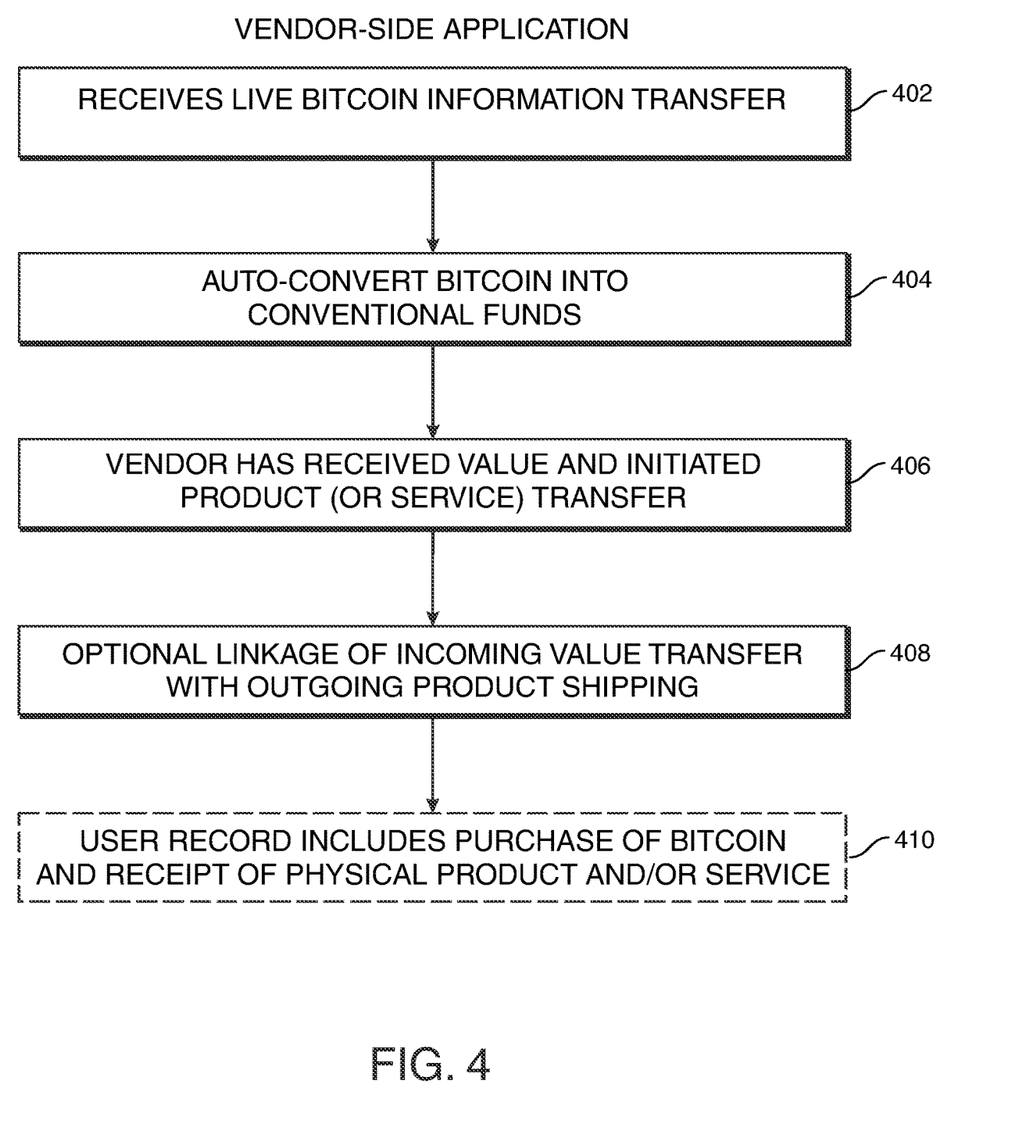
FIG. 4 shows an illustrative flow diagram of a vendor-side application in accordance with the principles of the disclosure.

FIG. 4 shows an illustrative flow diagram of a vendor-side application in accordance with the principles of the disclosure. At 402 the vendor may receive a live Bitcoin information transfer. Such a transfer may be actualized in the form of a QR code or other suitable transfer mechanism.

Following the receipt of the Bitcoin information transfer, the vendor-side application may auto-convert the Bitcoin into conventional funds. This auto-conversion may preferably immediately occur upon receipt of the Bitcoin information transfer, as shown at 404.

At 406, the vendor has preferably received value and initiated product (or service) transfer.

With respect to the electronic record keeping of the vendor, an optional linkage may be formed, as shown at 408, between the incoming value transfer and the outgoing product shipping. Alternatively, the vendor may decline to associate the two occurrences—i.e., the incoming value transfer and the outgoing product shipping.

It should be noted that the user records may include purchase of bitcoin, transfer of QR code and receipt of product and/or service, as shown at 410. Here as well the user may form an optional linkage between the outgoing value transfer and the incoming product receipt. Alternatively, the user may decline to associate the two occurrences—i.e., the outgoing value transfer and the incoming product receipt. As such the user's records will be agnostic to the occurrence of any cryptocurrency transactions.

Figure 5:
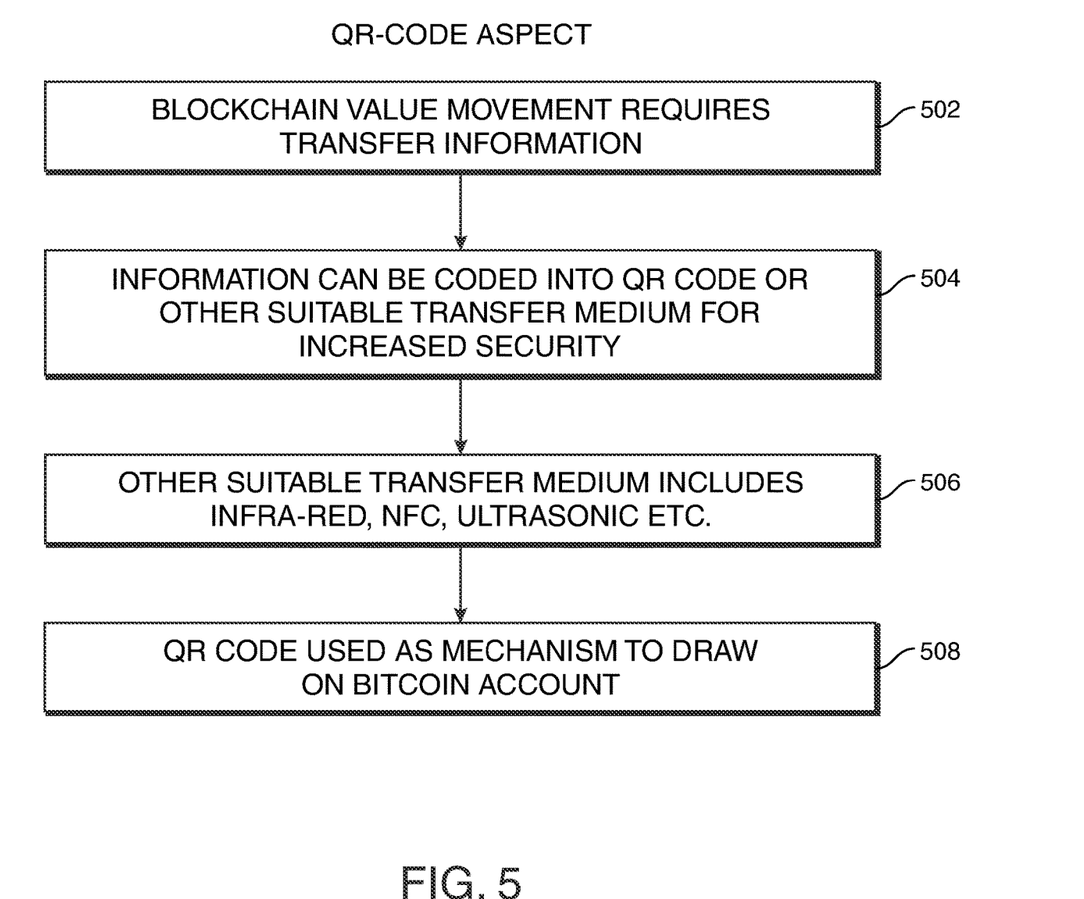
FIG. 5 shows an illustrative flow diagram of a QR code aspect of an application in accordance with the principles of the disclosure.

FIG. 5 shows an illustrative flow diagram of a QR code aspect of an application in accordance with the principles of the disclosure. At 502, a blockchain value movement may be implemented using such value as one or more cryptocurrencies.

Information can be coded for such a transfer into a QR code or other suitable transfer medium for increased security, as shown at 504. Other suitable transfer medium may include an infra-red medium, Near-Field Communication Medium (NFC), ultrasonic medium or other suitable cryptocurrency transfer, as shown at 506.

At 508, a QR code may be used by a vendor as a mechanism to draw on a user Bitcoin account. The QR code should preferably include all information necessary to enable a vendor to draw, to the extent authorized by the purchase instructions, on a cryptocurrency account associated with the user/purchaser.

Figure 6:
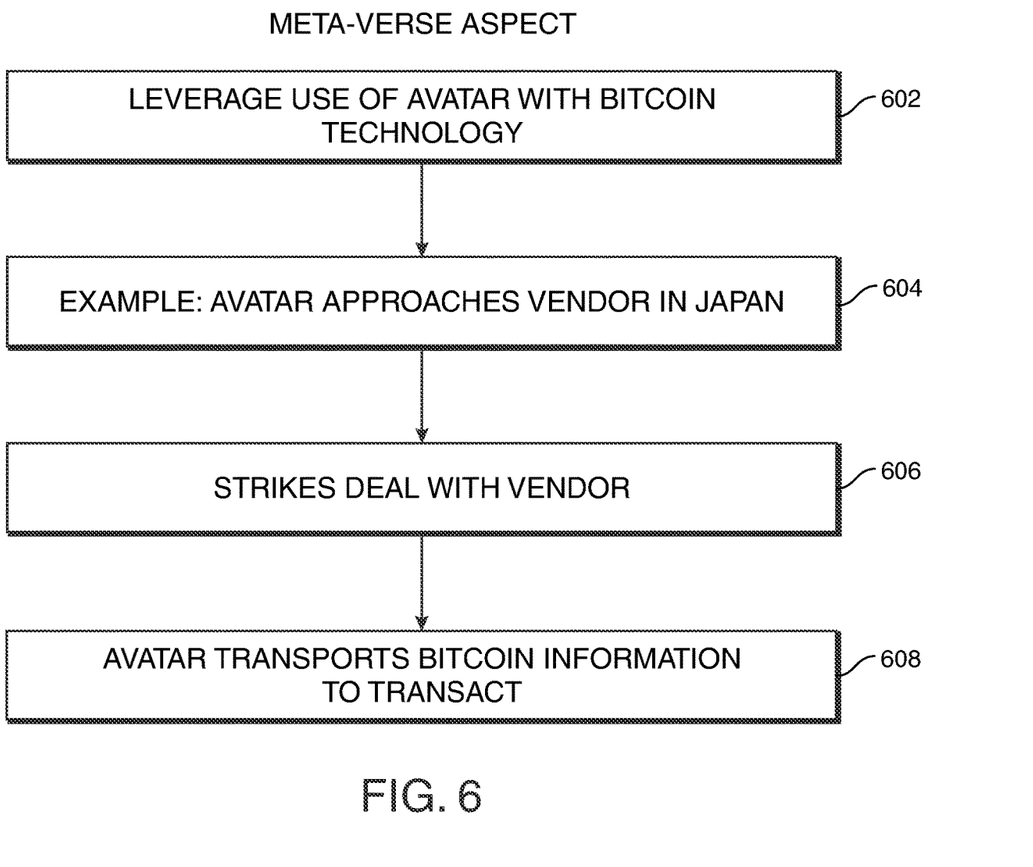
FIG. 6 shows an illustrative flow diagram of a meta-verse application in accordance with the principles of the disclosure.

FIG. 6 shows an illustrative flow diagram of a meta-verse application in accordance with the principles of the disclosure. At 602, the meta-verse aspect is shown leveraging use of a meta-verse based avatar capable of exchanging cryptocurrency or other Bitcoin value technology.

At 604, an example is shown in which an avatar approaches a vendor in Japan, and confirms the specifics of a purchase with the vendor at 606. The avatar may be used to transport bitcoin information to be transacted, as shown at 608.

The remaining portions of the transactions may be used in accordance with the other embodiments shown herein. More specifically, and as mentioned above, the illustrative embodiment shown in any of the figures may include features shown in connection with another illustrative embodiment.

As described herein, an objective of the current disclosure is to ensure relatively easy, safe and secure transactions with anonymity. The use of biometric authentication (e.g., in combination with a mobile phone) has been described herein as layered with QR-Code and Blockchain technologies. Furthermore, the d+b stored value transaction instrument protects the systems and methods described herein from utilization by non-authorized personnel while maintaining this above-described anonymity.

As the disclosure extends to usage on the Internet/Web3, one aspect of the disclosure may involve an Avatar registry, as follows. Such a registry may preferably limit the systems and methods to use that is exclusively associated to registered accounts.

One possible scenario according to the subject matter of the disclosure may be outlined as follows:
- Individuals want to use virtual cash on Internet/Web3 for procurement of goods and/or services;
- Users must create an approved avatar which is part of a secured registry (Similar to blockchain in its native form);
- Via the same registered account that users currently utilize for virtual cash, the created Avatar can purchase goods or services; and, finally;
- The avatar, or other accounts described herein, can preferably only transact online up to a threshold amount (pre-determined). That amount can further secure the systems and methods described herein so as to avoid a fraudulent, or otherwise suspicious, activity.

This layered approach preferably mitigates fraudulent activity by ever increasing suspicious actors seeking to compromise technology.

This layered approach will continue to mitigate abuse by ever increasing threat actors seeking to compromise technology.

Figure 7:
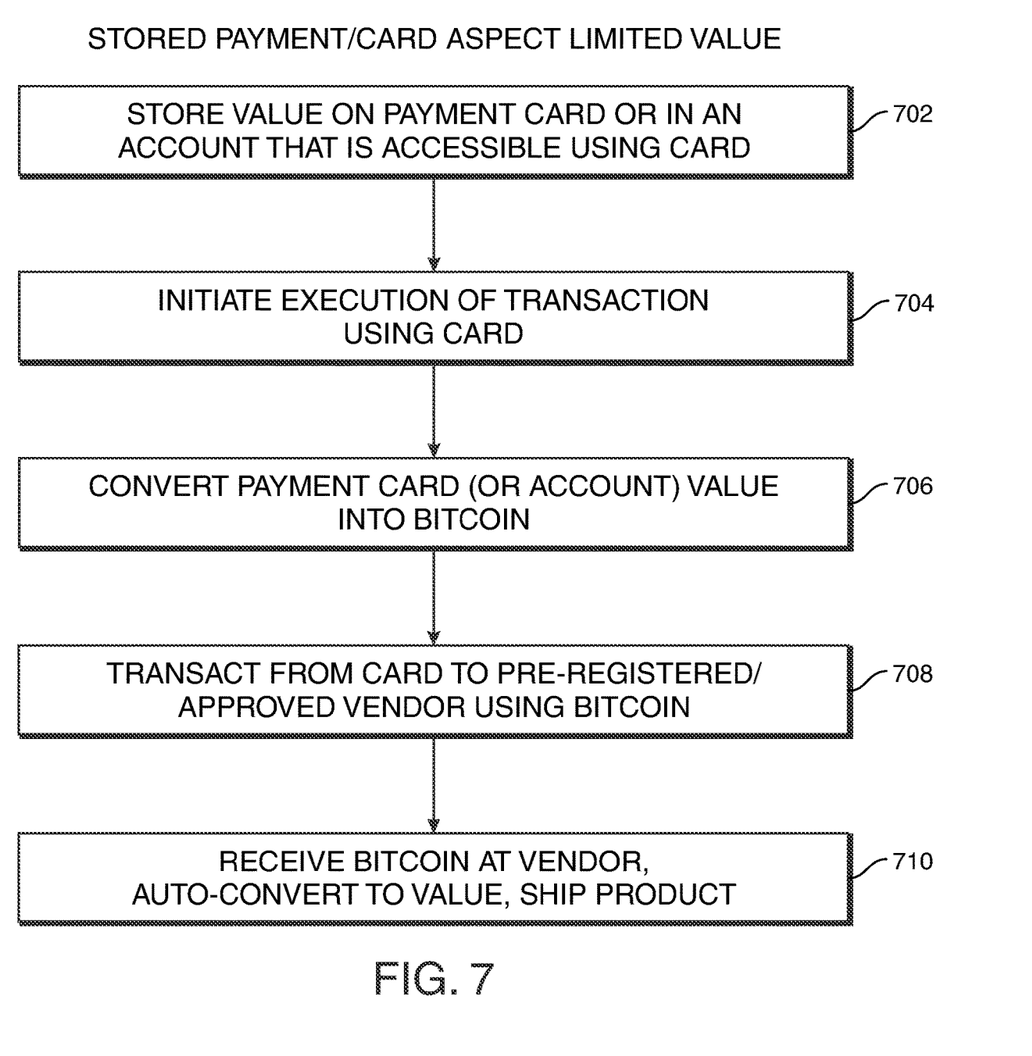
FIG. 7 shows an illustrative flow diagram of a stored payment/card limited value application in accordance with the principles of the disclosure.

FIG. 7 shows an illustrative flow diagram of a stored payment/card limited value application in accordance with the principles of the disclosure.

At 702, the aspect of stored value on a payment instrument or in an account that is accessible using a card is shown. At 704, the system preferably initiations execution of a transaction using a payment card according to the disclosures set forth herein.

As a pre-cursor to the execution of a transaction according to the systems and methods set forth herein the payment card (or associated account) value is converted to Bitcoin, as shown at 706.

Then, at 708, the transaction is implemented using the card which has been pre-registered to and/or approved by a vendor using Bitcoin. The scope of such embodiments typically includes transacting Bitcoin by leveraging the information stored on the stored payment card, or other payment instrument. Alternatively, the scope of such embodiments may include transacting using Bitcoin that has been withdrawn from a stored value card and deposited or otherwise stored in a second location.

Preferably independent of the way the value is transferred, the vendor may receive the Bitcoin at 710 and preferably auto-convert the Bitcoin to a different currency. Thereafter, the vendor preferably is in a fully—compensated position such that the vendor can ship the product or service that was agreed upon prior to execution by the seller.

Figure 8:
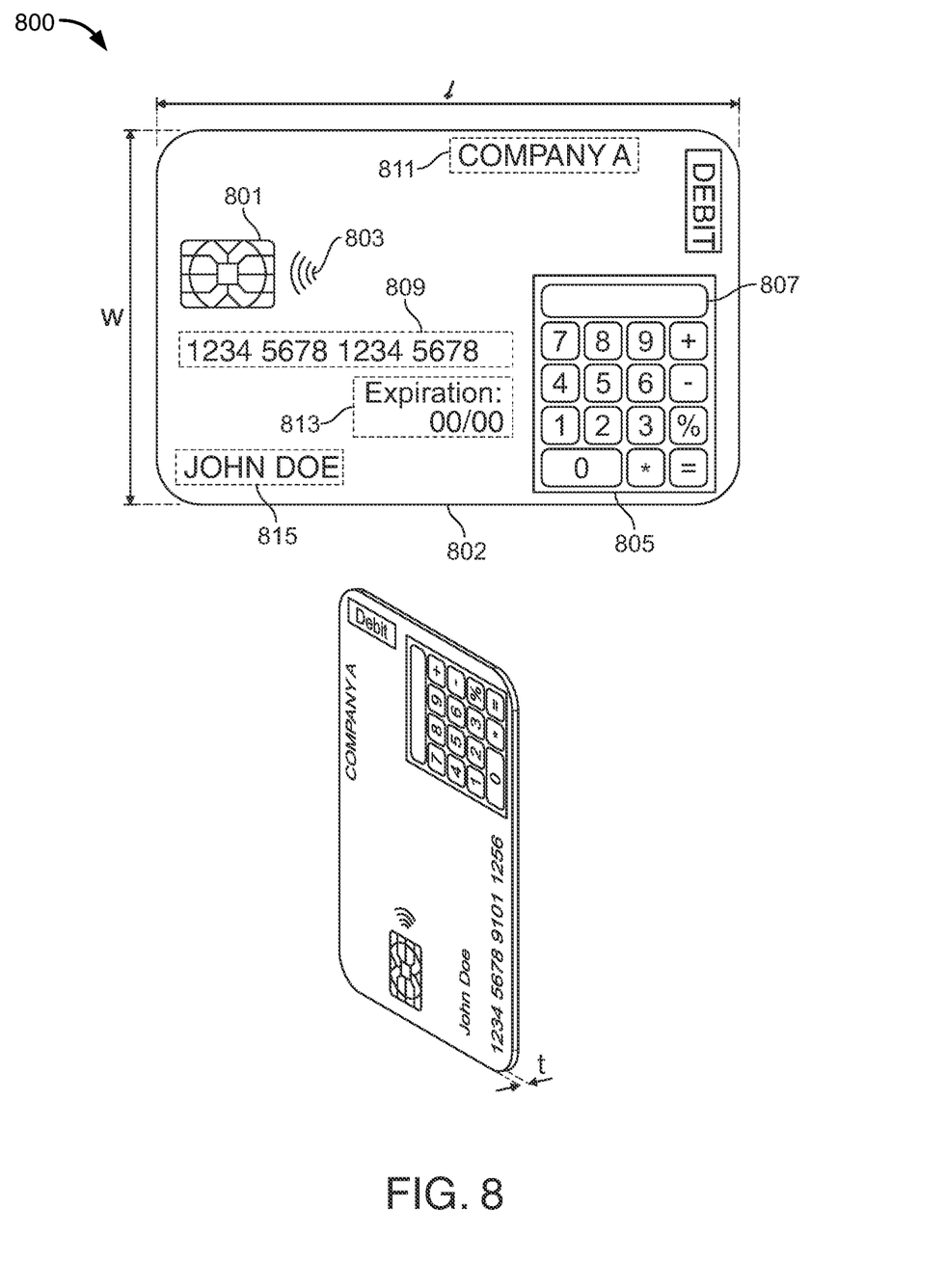
FIG. 8 shows another illustrative apparatus in accordance with principles of the disclosure.

FIG. 8 shows another illustrative apparatus—i.e., a payment instrument—in accordance with principles of the disclosure. The instrument may, in certain preferred embodiments, be a card. The card may include metal and/or plastic. The card may at least partially resemble a typical debit or credit card. The card may have dimensions that conform to the ISO/IEC 7810 ID-1 standard. The dimensions may, in some embodiments, be no greater than 86 millimeters×54 millimeters×0.8 millimeters.

Specifically, FIG. 8 shows an exemplary stored value payment instrument, illustrative transaction instrument 800, according to aspects of the disclosure. While the disclosure describes a stored value payment instrument, it should be noted that the disclosure also includes, within its scope, a credit card payment instrument, a debit card payment instrument, or any other suitable payment instrument.

Transaction instrument 800 includes keypad 805. Keypad 805 may be used by a user of transaction instrument 800 to enter information. Exemplary information may include a unique code presented by a payment recipient such as a utility provider, or a suitable name or code associated with a payment recipient or service category.

Transaction instrument 800 includes a microprocessor and other components for capturing and storing information entered by a user. Transaction instrument 800 may, in certain embodiments, be configured to encrypt the information. Transaction instrument 800 may also include executable instructions for packaging information entered via keypad 805 into transaction instructions (which may be referred to herein as a requests) that may be executed by a secure transaction gateway. The executable instructions may also formulate the transaction instructions based on transaction information stored on the transaction instrument. The transaction information may be sensitive.

FIG. 8 shows that transaction instrument 800 includes chip 801. Chip 801 may provide an electrical contact that is accessible through housing 802. Chip 801 may provide an electrical contact for establishing a wired or contact based communication channel with an ATM or POS terminal when card 800 is inserted into a card reader of the ATM or POS terminal. Chip 801 may be an EMV chip. Chip 801 may facilitate charging of one or more components of transaction instrument 800.

Chip 801 may store a copy of information printed on a face of transaction instrument 800. For example, chip 801 may store PAN 809, user name 815, expiration date 813 and issuing bank 811. Chip 801 may also store encrypted security information. The encrypted security information may be utilized to provide a "second factor" method of authentication prior to triggering execution of transaction instructions.

For example, transaction instrument 800 may package information entered by user 815 via keypad 805 into transaction instructions. The transaction instructions may include a PIN associated with transaction instrument 800. The staged transaction instructions may be submitted for execution to a transaction gateway without requiring any further input from user 815. The transaction instructions may be transferred to the transaction gateway using wireless circuitry 803. In some embodiments, the transaction instructions may be transferred via wired communication with chip 801.

After a transaction gateway receives transaction instructions formulated by transaction instrument 800, the transaction gateway may, in certain embodiments, first verify that the PIN included in the transaction instructions is associated with transaction instrument 800. For example, the transaction gateway may communicate with a remote payment processing server operated by the issuer and determine whether the received PIN is associated with user name 815 and/or PAN 809.

As a second factor method of authentication, the transaction gateway may determine whether the PIN included in the transaction instructions successfully unlocks encrypted security information stored on chip 801. If the PIN successfully unlocks the encrypted security information, the transaction gateway may execute the received transaction instructions.

Transaction instrument 800 may be any suitable size. FIG. 8 shows that transaction instrument 800 has width w and length l. For example, width w may be 53.98 millimeters ("mm"). Length l may be 85.60 mm. Transaction instrument 800 has thickness t. An illustrative thickness t may be 0.8 mm. An exemplary form factor of transaction instrument 800 may be 53.98 mm×85.60 mm×0.8 mm. Such an exemplary form factor may allow transaction instrument 800 to conveniently fit into a user's wallet or pocket. This exemplary form factor may allow transaction instrument 800 to fit into a card reader of an ATM or POS terminal.

Thus, methods and apparatus for providing a STORED VALUE PAYMENT INSTRUMENT, HAVING PAYMENT CARD CHARACTERISTICS, FOR VIRTUAL CASH TRANSACTIONS are provided. Persons skilled in the art will appreciate that the present invention can be practiced by other than the described embodiments, which are presented for purposes of illustration rather than of limitation, and that the present invention is limited only by the claims that follow.

What is claimed is:

1. A method for providing a digital+bitcoin (d+b) stored value card comprising:
   configuring the d+b stored value card with a cryptocurrency provider;
   receiving a value allocation from a user, via a keypad included in the d+b value card, the value allocation associated with a d+b stored value card-supporting vendor;
   receiving from the user a request, via a chip included in the d+b stored value card, for a cryptocurrency transaction with the d+b stored value card-supporting vendor, the chip including a microprocessor, the microprocessor being configured to store encrypted security information relating to the user;
   packaging information into transaction instructions, the information relating to the request, the transaction instructions including a PIN associated with the d+b stored value card;
   in response to receiving a consent to transact from the d+b stored value card-supporting vendor, establishing a transaction gateway for communication with the d+b stored value card-supporting vendor, the establishing being executed via wireless circuitry included in the d+b stored value card;
   exchanging Quick Response ("QR") codes between the d+b stored value card and the d+b stored value card-supporting vendor, via the transaction gateway, each of the QR codes encoded with:
      a) an amount of cryptocurrency greater than or equal to a value necessary for the cryptocurrency transaction; and
      b) a product or a service to be provided by the d+b stored value card-supporting vendor to the user;
   in response to receiving a scan of the QR code received by the d+b stored value card and in response to a scan of the QR code received by the d+b stored value card-supporting vendor, determining whether the PIN included in the transaction instructions successfully unlocks the encrypted security information stored at the microprocessor; and
   in response to the PIN successfully unlocking the encrypted security information, executing the transaction instructions, the executing comprising:
      procuring the amount of cryptocurrency from the cryptocurrency provider;
      transferring, as cryptocurrency, the value necessary for the cryptocurrency transaction to the d+b stored value card-supporting vendor; and
      receiving from the d+b stored value card-supporting vendor a confirmation of receipt of the cryptocurrency.

2. The method of claim 1 further comprising receiving from the d+b stored value card-supporting vendor a confirmation of receipt of the cryptocurrency and receiving a confirmation from the d+b stored value card-supporting vendor that the cryptocurrency has been auto-converted to a second currency.

3. The method of claim 1 further comprising temporarily storing the confirmation of the receipt of the cryptocurrency pending receipt by the user of the product or service.

4. The method of claim 1, wherein the d+b stored value card comprises metal and/or plastic.

5. The method of claim 4, wherein the d+b stored value card has dimensions that conform to the ISO/IEC 7810 ID-1 standard, said dimensions being no greater than 86 millimeters X 54 millimeters X 0.8 millimeters.

6. A method for providing a digital+bitcoin (d+b) stored value card comprising:
   configuring the d+b stored value card with a partner cryptocurrency provider;
   receiving a value allocation, from a user, via a keypad included in the d+b value card, the value allocation associated with a d+b stored value card-supporting vendor;
   receiving from the user a request, via a chip included in the d+b stored value card, for a cryptocurrency transaction with the d+b stored value card-supporting vendor, the chip including a microprocessor, the microprocessor being configured to store encrypted security information relating to the user;
   packaging information into transaction instructions, the information relating to the request, the transaction instructions including a PIN associated with the d+b stored value card;
   in response to receiving a consent to transact from the d+b stored value card-supporting vendor, establishing a transaction gateway for communication with the d+b stored value card-supporting vendor, the establishing being executed via wireless circuitry included in the d+b stored value card;
   activating a Quick Response ("QR") code feature on the d+b stored value card at a user device for an amount that is less than or equal to the value allocation;
   exchanging QR codes between the d+b stored value card and the d+b stored value card-supporting vendor, each of the QR codes encoded with:
      a) an amount of cryptocurrency greater than or equal to a value necessary for the cryptocurrency transaction; and
      b) a product or a service to be provided by the d+b stored value card-supporting vendor to the user in exchange for the amount of cryptocurrency;
   exchanging a plurality of scans of each of the QR codes between the d+b stored value card and the d+b stored value card-supporting vendor,
   in response to the exchanging of the plurality of scans of the QR codes, determining whether the PIN included in the transaction instructions successfully unlocks the encrypted security information stored on the chip at the microprocessor; and in response to determining that the PIN successfully unlocking unlocks the encrypted security information, executing the transaction instructions, the executing comprising:

procuring the amount of cryptocurrency from the partner cryptocurrency provider;

transferring, as cryptocurrency, the value necessary for the cryptocurrency transaction to the d+b stored value card-supporting vendor; and receiving from the d+b stored value card-supporting vendor a confirmation of receipt of the cryptocurrency.

7. The method of claim 6 further comprising receiving from the d+b stored value card-supporting vendor a confirmation of receipt of the cryptocurrency and receiving a confirmation from the d+b stored value card-supporting vendor that the cryptocurrency has been auto-converted to a second currency.

8. The method of claim 7 further comprising temporarily storing the confirmation of the receipt of the cryptocurrency pending receipt by the user of the product or service.

9. The method of claim 7, wherein the d+b stored value card comprises metal and/or plastic.

10. The method of claim 9, wherein the d+b stored value card has dimensions that conform to the ISO/IEC 7810 ID-1 standard, said dimensions being no greater than 86 millimeters X 54 millimeters X 0.8 millimeters.

11. A digital+bitcoin (d+b) stored value card comprising:

a keypad for receiving a value allocation from a user for the d+b stored value card, the value allocation associated with a d+b stored value card-supporting vendor;

a chip for:

receiving from the user a request for a cryptocurrency transaction with the d+b stored value card-supporting vendor; and storing encrypted security information relating to the user;

a microprocessor for packaging information into transaction instructions, the information relating to the request, the transaction instructions including a PIN associated with the d+b stored value card; and wireless circuitry for:

receiving a consent to transact from the d+b stored value card-supporting vendor; and in response to receiving a consent to transact from the d+b stored value card-supporting vendor, establishing a transaction gateway for communication with the d+b stored value card-supporting vendor;

wherein the transaction gateway is further configured to:

collaborate to exchange Quick Response ("QR") codes between the d+b stored value card and the d+b stored value card-supporting vendor, each of the QR codes encoded with:

a) an amount of cryptocurrency greater than or equal to a value necessary for the cryptocurrency transaction; and b) a product or a service to be provided, in return for the amount of cryptocurrency, by the d+b stored value card-supporting vendor to the user;

in response to receiving a scan of the QR codes from the d+b stored value card and the d+b stored value card-supporting vendor, determine whether the PIN included in the transaction instructions successfully unlocks the encrypted security information stored on the chip; and in response to a determination that the PIN successfully unlocks the encrypted security information:

procure the amount of cryptocurrency from a cryptocurrency provider;

transfer, as cryptocurrency, the value necessary for the cryptocurrency transaction to the d+b stored value card-supporting vendor; and receive from the d+b stored value card-supporting vendor a confirmation of receipt of the cryptocurrency.

12. The d+b stored value card of claim 11 wherein the microprocessor is further configured to receive from the d+b stored value card-supporting vendor a confirmation of receipt of the cryptocurrency and receiving a confirmation from the d+b stored value card-supporting vendor that the cryptocurrency has been auto-converted to a second currency.

13. The d+b stored value card of claim 11 wherein the microprocessor is further configured to use a memory to temporarily store the confirmation of the receipt of the cryptocurrency pending receipt by the user of the product or service.

14. The d+b stored value card of claim 11 wherein the d+b stored value card comprises metal and/or plastic.

15. The d+b stored value card of claim 14, wherein the d+b stored value card has dimensions that conform to the ISO/IEC 7810 ID-1 standard, said dimensions being no greater than 86 millimeters X 54 millimeters X 0.8 millimeters.

* * * * *